US 6,715,024 B1

(12) United States Patent
Lin (10) Patent No.: US 6,715,024 B1
(45) Date of Patent: Mar. 30, 2004

(54) MULTI-BANK MEMORY DEVICE HAVING A 1:1 STATE MACHINE-TO-MEMORY BANK RATIO

(75) Inventor: Shuaibin Lin, Broomfield, CO (US)

(73) Assignee: LSI Logic Corporation, Milpitas, CA (US)

(*) Notice: Subject to any disclaimer, the term of this patent is extended or adjusted under 35 U.S.C. 154(b) by 163 days.

(21) Appl. No.: 10/036,695

(22) Filed: Dec. 31, 2001

(51) Int. Cl.[7] ............................................. G06F 12/00
(52) U.S. Cl. ...................... 711/5; 711/147; 711/149; 711/156; 711/150; 711/168
(58) Field of Search ........................ 711/5, 147, 149, 711/156, 150, 168, 111, 100

(56) References Cited

U.S. PATENT DOCUMENTS

| | | | |
|---|---|---|---|
| 5,265,212 A | * 11/1993 | Bruce, II | 710/113 |
| 6,058,451 A | * 5/2000 | Bermingham et al. | 711/106 |
| 6,389,520 B2 | * 5/2002 | Christenson | 711/157 |
| 6,535,966 B1 | * 3/2003 | Cherabuddi et al. | 711/154 |

* cited by examiner

*Primary Examiner*—Matthew Kim
*Assistant Examiner*—Zhuo H Li
(74) *Attorney, Agent, or Firm*—Conley Rose, P.C.

(57) ABSTRACT

A memory controller includes an input command decoder circuit for generating an input command, a state machine controller coupled to receive the input command from the input command decoder circuit and generate a state machine input instruction therefrom, a state machine array comprised of a plurality of state machines coupled to receive the input command and state machine input instructions from the state machine controller and to generate state machine output instructions therefrom, and an output command decoder circuit for receiving a state machine output command and generating an output command therefrom for transmission to a memory, associated with the memory controller, comprised of a plurality of memory banks. A first state machine execute a state machine input instruction transmitted, with the input conunand, to all state machines if a memory address contained within the input command corresponds to an address for a corresponding memory bank.

34 Claims, 4 Drawing Sheets

MULTI-BANK MEMORY DEVICE HAVING A 1:1 STATE MACHINE-TO-MEMORY BANK RATIO

CROSS REFERENCE TO RELATED APPLICATIONS

Not Applicable.

STATEMENT REGARDING FEDERALLY SPONSORED RESEARCH OR DEVELOPMENT

Not Applicable.

REFERENCE TO A MICROFICHE APPENDIX

Not Applicable.

FIELD OF THE INVENTION

The present invention relates to a memory controller and an associated multi-bank synchronous dynamic random access memory (SDRAM) device and, more particularly, to a memory controller for a multi-bank SDRAM device which implements a 1:1 state machine-to-memory bank ratio to enhance the scalability thereof.

BACKGROUND OF THE INVENTION

In recent years, multi-bank memory devices such as double data rate (DDR) SDRAMS have become increasingly common. One advantage to using DDR SDRAMS and other multi-bank memory devices is that each bank of the multi-bank memory device can have a row active at the same time. As a result, when one bank of the memory device needs to conduct a time consuming operation, for example, switching between rows, the memory device may still conduct operations using an active row from another bank. Thus, at any given time, different banks of a multi-bank memory device may independently conduct different operations.

Operations performed using the various banks of a multi-bank memory device are coordinated by a controller. To perform this function, the controller includes a state machine which maintains a map of the various states of the memory device. Heretofore, multi-bank memory devices have typically employed a single state machine, regardless of the number of memory banks to be serviced thereby. As each bank of a conventional multi-bank may be in a different state, as the number of banks in the memory device increase, so has the number of different states which must be mapped to the state machine. Thus, each time a memory device having a different number of memory banks is proposed, a new state machine must be designed to service those banks. As a result, when designing a new multi-bank memory device, significant resources must be dedicated to design a state machine capable of servicing the new memory bank configuration. Furthermore, as memory devices with increasing numbers of memory banks are proposed, the cost and time incurred in re-designing state machines to service the greater number of banks is only expected to increase.

For these reasons, it would be desirable to have a memory controller readily scalable for use in multi-bank memory devices having various numbers of memory banks.

SUMMARY OF THE INVENTION

In one embodiment, the present invention is directed to a computer system having a processor, a memory having a plurality of memory banks and a memory controller for coupling the processor with the memory banks. The memory controller includes a plurality of state machines configured to commonly receive a state machine instruction and a memory address. Each one of the plurality of state machines corresponds to one of the plurality of memory banks. A first one of the plurality of state machines executes the state machine instruction if the memory address corresponds to an address for the corresponding one of the memory banks.

In another embodiment, the present invention is directed to a computer system having a processor, a memory having a plurality of memory banks and a memory controller for coupling the processor with the memory banks. The memory controller includes an input command decoder circuit coupled to receive a raw command from the processor and generate an input command therefrom, a state machine controller coupled to receive the input command from the input command decoder circuit and generate a state machine input instruction therefrom, a state machine array comprised of a plurality of state machines, each corresponding to one of the memory banks, the state machine array coupled to receive input commands and state machine input instructions from the state machine controller and generate state machine output instructions therefrom, and an output command decoder circuit for receiving a state machine output command and generating an output command therefrom for transmission to the memory. A first one of the plurality of state machines executes a state machine input instruction transmitted to each one of the plurality of state machines if a memory address contained within the input command transmitted to each one of the plurality of state machines corresponds to an address for the corresponding one of the memory banks.

In still another embodiment, the present invention is directed to a computer system having a processor, a memory having a plurality of memory banks and a memory controller for coupling the processor with the memory banks. The memory controller includes an input command decoder circuit coupled to receive a raw command from the processor and generate an input command therefrom, a state machine controller coupled to receive the input command from the input command decoder circuit and generate a state machine input instruction therefrom, a state machine array comprised of a plurality of state machines, each corresponding to one of the memory banks, the state machine array coupled to receive the input commands from the input command decoder circuit, receive state machine input instructions from the state machine controller and generate state machine output instructions from the state machine input instructions, and an output command decoder circuit for receiving a state machine output command and generating an output command therefrom for transmission to the memory. A first one of the plurality of state machines executes a state machine input instruction transmitted to each one of the plurality of state machines if a memory address contained within the input command received from the input command decoder circuit corresponds to an address for the corresponding one of the memory banks.

In still yet another embodiment, the present invention is directed to a multi-bank memory device comprised of a plurality of memory banks and a state machine array coupled to the plurality of memory banks. The state machine array includes a plurality of state machines, each controlling the state of a corresponding one of the plurality of memory banks. The multi-bank memory device is arranged to have a state machine-to-memory bank ratio of 1:1. In various further aspects thereof, the multi-bank memory device may be a SDRAM or DDR SDRAM device.

In other aspects thereof, the multi-bank memory device further includes a state machine controller, coupled to an input side of the state machine array, for generating a state machine instruction from an input command received thereby and selectively transmitting the generated state machine instruction to the plurality of state machines of the state machine array. The state machine controller may also transmit, with the state machine input instruction, the input command to the plurality of state machines of the state machine array. In this aspect, a first one of the plurality of state machines executes the state machine instruction if a memory address contained in the input command corresponds to an address for the corresponding one of the plurality of memory banks. Alternately, each one of the plurality of state machines of the state machine array and the state machine controller may commonly receive the input command.

In certain aspects of these embodiments of the invention, each one of the plurality of state machines is configured in accordance with a common state diagram. The common state diagram may be comprised of first and second portions, the first containing bank-specific states and the second containing shared states. In further aspects thereof, the memory controller may be further configured such that: (1) the state machine controller generates the state machine output command if the state machine input command would cause a state machine configured in accordance with the common state diagram to enter or exit one of the shared states and/or (2) the state machine controller generates the state machine output command if the state machine input command would cause a state machine configured in accordance with the common state diagram to transition between first and second ones of the bank-specific states.

In still another embodiment, the present invention is directed to a method for constructing a memory device by providing a first plurality of state machines and a second plurality of memory banks and coupling the first plurality of state machines to the second plurality of memory banks such that each one of the first plurality of state machines controls the state of a corresponding one of the second plurality of memory banks and that the first plurality of state machines and the second plurality of memory banks are interconnected in a state machine-to-memory bank ratio of 1:1.

DETAILED DESCRIPTION OF THE INVENTION

Figure 1:
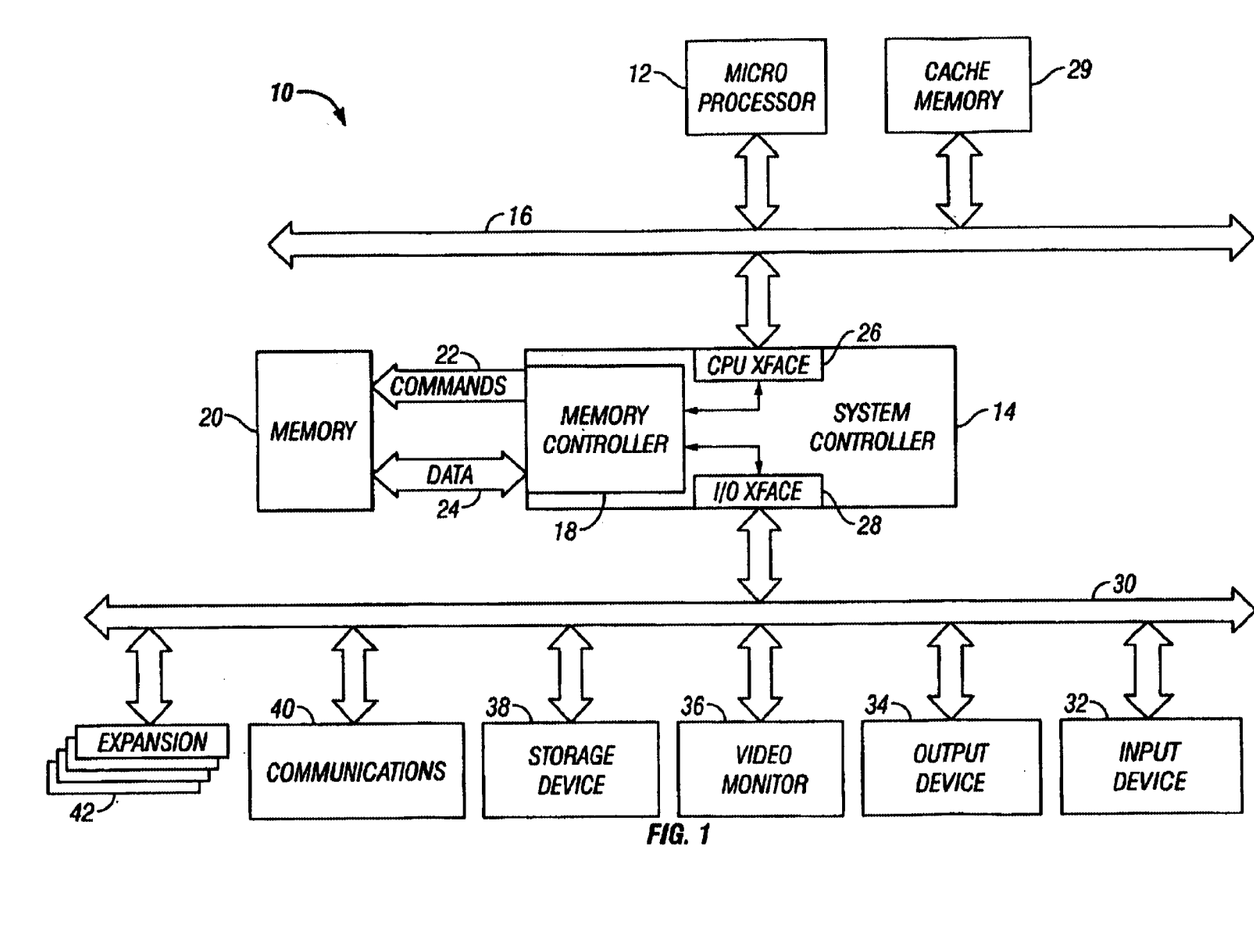
FIG. 1 is a block diagram of a computer system constructed in accordance with the teachings of the present invention.

Referring first to FIG. 1, a computer system 10 constructed in accordance with the teachings of the present invention may now be seen. The computer system 10 includes a central processing unit (CPU) 12 for example, a microprocessor, coupled to a system controller 14 by a processor bus 16 that carries address, data and control signals therebetween. The system controller 14 includes a memory controller 18 for accessing a main memory 20 via a memory command bus 22 and a memory data bus 24. The system controller 14 also includes CPU interface circuitry 26, a cache controller (not shown), and input/output (I/O) interface circuitry 28. The CPU interface circuitry 26 couples the microprocessor 12 with other components of the system controller 14 such as the memory controller 18. The cache controller controls data transfer operations to a cache memory 29 that provides higher speed access to a subset of the information stored in the main memory 20.

Multiple I/O devices are coupled to the system controller 14 by I/0 interface circuitry 28 and I/O bus 30. Of course, the I/O bus 30 may itself be a combination of one or more bus systems and associated circuitry. As shown in FIG. 1, the multiple I/O devices coupled to the system controller 14 by the I/O interface circuitry 28 and the I/O bus 30 include a data input device 32, for example a keyboard or mouse, a data output device 34, for example, a printer, a video monitor 36 (which, while not shown in FIG. 1 for ease of description, is typically coupled with the system controller 14 by a high speed video bus), an auxiliary data storage device 38, for example, a hard disk, and a communications device 40, for example, a modem or local area network (LAN) interface. Finally, one or more expansion slots 42 are provided for accommodation of other I/O devices not shown in FIG. 1.

Figure 2A:
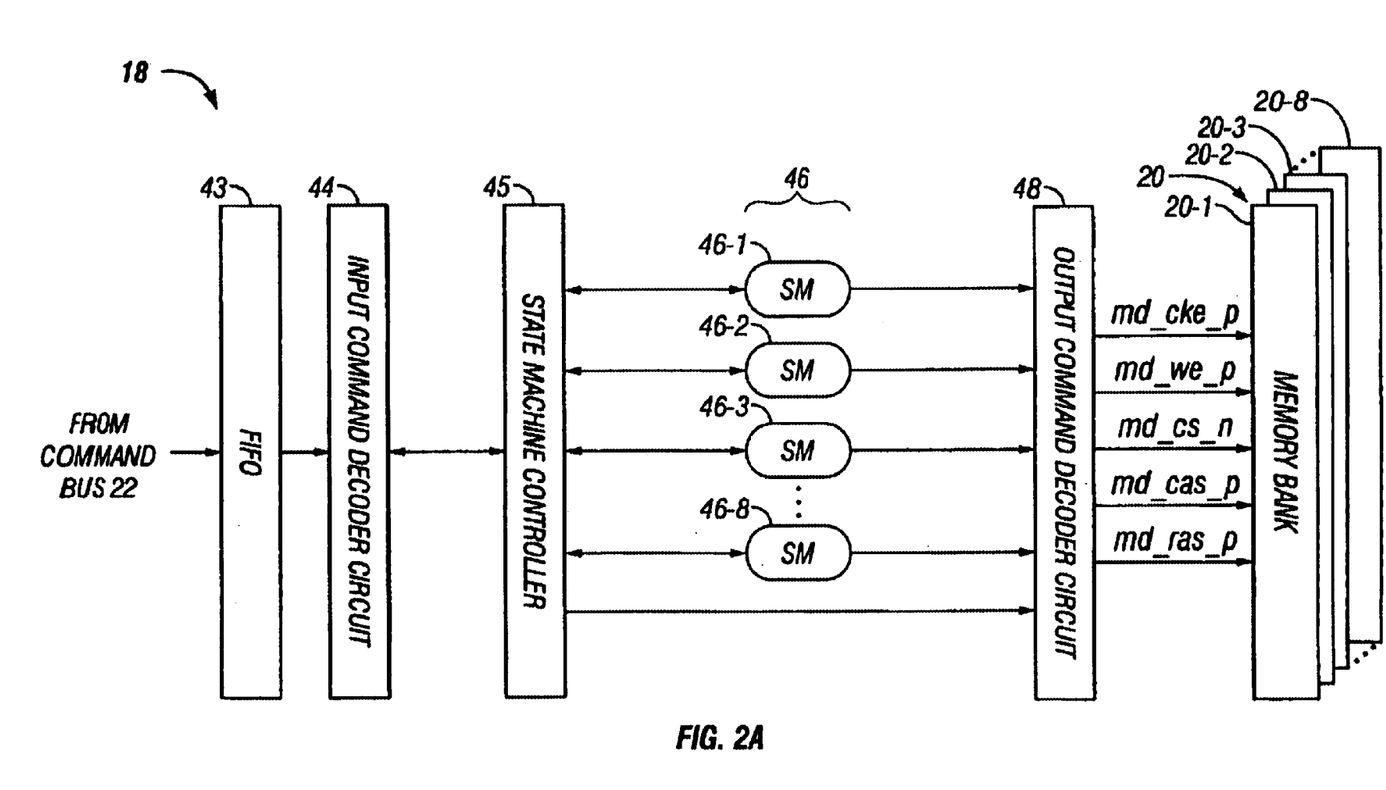
FIG. 2A is an expanded block diagram of a memory controller and a memory of the computer system of FIG. 1.

Referring next to FIG. 2A, the memory controller 18 and the main memory 20 will now be described in greater detail. As may now be seen, the main memory 20 is configured as a DDR SDRAM device having eight memory banks 20-1 through 20-8. Of course, it is fully contemplated that other types of memory devices, for example, SRAM or SDRAM devices, are equally suitable for the uses contemplated herein. Furthermore, the disclosure of the main memory 20 as being configured to have eight memory banks is purely by way of example and it is fully contemplated that, subject to certain requirements to be set forth below, the main memory 20 may be configured to have any desired number of memory banks. For example, many current memory devices utilize four memory banks. Accordingly, in one aspect of the invention, rather than having eight banks, it is contemplated that the main memory 20 may be configured to include only four memory banks.

Of course, while the memory controller 18 and the main memory 20 of FIG. 2A are suitable for use within a computer system such as the computer system 10 illustrated in FIG. 1, it should be clearly understood that such a use is but one of a wide variety of suitable uses for the memory controller 18 and the main memory 20. Accordingly, while the term "main" is used in conjunction with the memory 20 in view of the disclosed use thereof within the computer system 10, the term should not be seen as limiting the invention to any specific embodiment thereof. Furthermore, while computer systems such as the computer system 10 typically include one or more memory devices in addition to the main memory, it should be clearly understood that the memory controller 18 and the main memory controller 20 may collectively be viewed as a memory subsystem suitable for use within a computer system or another memory-demanding electronic device.

Also shown in FIG. 2A is a first, or output command generation, portion of the memory controller 18. More specifically, FIG. 2A illustrates that portion of the memory controller 18 which receives raw read/write commands over the command bus 22, uses the received raw read/write commands to generate output commands to be used in connection with data reads and/or data writes to/from the main memory 20 and issues the generated output commands to the main memory 20. The output commands issued by the memory controller 18 to the main memory 20 include clock enable (CKE), write enable (WE), chip select (CS), column address select (CAS), row address select (RAS), bank select (BANK), row/column address (ADDR) and write data mask (DM) commands. The remaining portions of the memory controller 18, including those portions of the memory controller 18 dedicated to transmitting write data to the main memory 20 and receiving read data from the main memory 20, have been omitted from FIG. 2A for ease of description.

The output command generation portion of the memory controller 18 is comprised of a command first-in-first-out (FIFO) register 43, an input command decoder circuit 44, a state machine array controller 45, a state machine array 46 and an output command decoder circuit 48. Of these, the state machine array 46 is comprised of eight state machines 46-1 through 46-8 coupled in parallel between the state machine controller 45 and the output command decoder circuit 48. While, as previously stated, the present disclosure of the memory 20 as including eight memory banks 20-1 through 20-8 is purely by way of example, it should be noted that, in accordance with one embodiment of the invention, the memory controller 18 and the main memory 20 are configured such that a computer system or other device which incorporates the disclosed memory controller 18 and main memory 20 is characterized by a state machine-to-memory bank ratio of 1:1. Thus, a memory controller associated with a memory device which includes four memory banks would have four state machines, a memory controller associated with a memory device which includes eight memory banks would have eight state machines and a memory controller associated with a memory device which includes sixteen memory banks would have sixteen state machines.

By configuring the main memory 20 and the memory controller 18 associated therewith to have a state machine-to-memory bank ratio of 1:1, a readily scalable memory subsystem has been designed. More specifically, the number of memory banks used in a memory subsystem may be selected based upon the capacity desired for the memory subsystem. Once the number of memory banks has been selected, a memory subsystem in which the memory controller associated with the memory bank is configured to have a matching number of state machines. Ease of scalability is achieved because, unlike prior techniques whereby a single state machine controlled a multi-bank memory device and a new design for the state machine was required for each different multi-bank memory configuration, in accordance with one embodiment of the present invention, a separate state machine controls the state of a corresponding bank of the multi-bank memory device and each state machine shares a common state diagram. Thus, to increase the number of banks in a multi-bank memory device, a designer need only add a desired number of additional state machines, all of which share their design with the existing state machine, and does not have to design any new circuitry.

The command FIFO 43 is a two entry deep FIFO that queues raw commands received over the command bus 22. When the state machine array 46 is ready for a new state machine input command, the state machine controller 45 issues a control signal to the input command decoder circuit 44 which causes the input command decoder circuit 44 to fetch the contents of a first entry in the command FIFO 43. Within the input command decoder circuit 44, raw commands fetched from the first entry of the command FIFO 43 are converted into input commands which include, among other components, a chip and bank address for the data transfer request. The input commands generated by the input command decoder circuit 44 are transmitted to the state machine controller 45 for further decoding. More specifically, for each input command received thereby, the state machine controller 45 determines a corresponding state machine input command related to a state transition which a target memory bank, i.e., the memory bank corresponding to the chip and bank address contained in the input command, must undergo in order to execute the input command.

When received by a state machine, a state machine input command causes the state machine to change from a current state to a next state and to generate a state machine output command which will cause the target memory bank to perform the desired state transition. Table I, below, lists the state machine input commands which may be issued to the state machines 46-1 through 46-8, a current state for a state machine receiving the state machine input command, a state machine output command generated by the receiving state machine in response to receipt of the state machine input command and a next state for the state machine receiving the state machine input command.

TABLE I

| Input Command | Current State | Output Command | Next State |
|---|---|---|---|
| Md_nop_state_p | Any | NOP | Unchanged |
| md_q_reset_p | Any | N/A | INIT |
| Md_init_close_p | INIT | NOP | CLOSE |
| Md_autoref_close_p | AUTOREF | NOP | CLOSE |
| Md_refexit_close_p | REFEXIT | NOP | CLOSE |
| Md_cal_close_p | CAL | NOP | CLOSE |
| md_preall_selfref_p | PREALL | REFS | SELFREF |
| md_preall_autoref_p | PREALL | REFA | AUTOREF |
| md_selfref_refexit_p | SELFREF | SREX | REFEXIT |
| md_close_activate_p | PRE | ACTIVATE | ACT |
| Md_read_read_p | READ | READ | READ |
| Md_open_read_p | OPEN | READ | READ |
| md_activate_read_p | ACT | READ | READ |
| Md_write_write_p | WRITE | WRITE | WRITE |
| Md_open_write_p | OPEN | WRITE | WRITE |
| md_activate_write_p | ACT | WRITE | WRITE |
| md_activate_open_p | ACT | NOP | OPEN |
| Md_read_open_p | READ | NOP | OPEN |
| Md_write_open_p | WRITE | NOP | OPEN |
| Md_open_pre_p | OPEN | PRE | PRE |
| md_read_pre_p | READ | PRE | PRE |
| md_prerdy_preall_p | PRERDY | PREALL | PREALL |
| md_close_prerdy_p | CLOSE | NOP | PRERDY |
| Md_pre_prerdy_p | PRE | NOP | PRERDY |
| Md_open_prerdy_p | OPEN | NOP | PRERDY |
| Md_autoref_cal_p | AUTOREF | NOP | CAL |

As may be seen in Table I, above, and as will be more fully described with respect to FIG. 3, below, each state machine 46-1 through 46-8 may be in any one of thirteen different states. These states are: (1) an initialization (INIT) state; (2) a CLOSE state; (3) an activate (ACT) state; (4) an OPEN state; (5) a READ state; (6) a WRITE state; (7) a precharge all (PREALL) state; (8) a precharge ready (PRERDY) state; (9) a precharge (PRE) state; (10) an auto refresh (AUTOREF) state; (11) a self refresh (SELFREF) state; (12) a self refresh exit (REFEXIT) state; and (13) a calibrate (CAL) state. These states may be sub-divided into two groups—the first comprised of shared states and the second comprised of bank-specific states. As the name suggests, if a state is a "shared state", all of the state machines 46-1 through 46-8 of the state machine array 46 will transition into and out of that state together. Of the thirteen states set forth above, the INIT, SELFREF, REFEXIT, AUTOREF, CAL and PREALL states are shared states for which all of the state machines 46-1 through 46-8 transition into and out of together. The remaining states (CLOSE, ACTIVATE, PRE, READ, WRITE, OPEN and PRERDY) are bank-specific states which individual ones of the state machines 46-1 through 46-8 transition into and out of.

Table I also lists the various state machine input commands which may be generated by the state machine controller 45 based upon the input command received from the input command decoder circuit 44. Similar to the categorization of the thirteen states as either shared states or bank-specific states, the state machine input commands may be categorized as a shared state machine input command if the input command would cause a state machine to transition into or out of a shared state or a bank-specific state machine input command if the input command would cause the state machine to transition into or out of a bank-specific state. For those transitions between a bank-specific state and a shared state, more specifically, when the state machines 46-1 through 46-8 are herded into the PREALL shared states through the PRERDY state or when the state machines 46-1 through 46-8 are moved together out of a shared state through the CLOSE state, while these transitions involve a bank-specific state, they should be categorized as shared state transitions.

Table II, below, lists those state machine input commands from Table I which may be further characterized as shared state machine input commands and Table III, below, lists those state machine input commands from Table I which may be further characterized as bank-specific state machine input commands.

TABLE II

| Input Command | Current State | Output Command | Next State |
| --- | --- | --- | --- |
| Md_q_reset_p | Any | N/A | INIT |
| Md_init_close_p | INIT | NOP | CLOSE |
| md_autoref_close_p | AUTOREF | NOP | CLOSE |
| md_refexit_close_p | REFEXIT | NOP | CLOSE |
| Md_cal_close_p | CAL | NOP | CLOSE |
| md_preall_selfref_p | PREALL | REFS | SELFREF |
| md_preall_autoref_p | PREALL | REFA | AUTOREF |
| md_selfref_refexit_p | SELFREF | SREX | REFEXIT |
| md_prerdy_preall_p | PRERDY | PREALL | PREALL |
| Md_autoref_cal_p | AUTOREF | NOP | CAL |

TABLE III

| Input Command | Current State | Output Command | Next State |
| --- | --- | --- | --- |
| md_close activate_p | PRE | ACTIVATE | ACT |
| Md_read_read_p | READ | READ | READ |
| Md_open_read_p | OPEN | READ | READ |
| md_activate_read_p | ACT | READ | READ |
| Md_write_write_p | WRITE | WRITE | WRITE |
| Md_open_write_p | OPEN | WRITE | WRITE |
| md_activate_write_p | ACT | WRITE | WRITE |
| md_activate_open_p | ACT | NOP | OPEN |
| Md_read_open_p | READ | NOP | OPEN |
| Md_write_open_p | WRITE | NOP | OPEN |
| Md_open_pre_p | OPEN | PRE | PRE |
| md_read_pre_p | READ | PRE | PRE |
| md_close_prerdy_p | CLOSE | NOP | PRERDY |
| Md_pre_prerdy_p | PRE | NOP | PRERDY |
| md_open_prerdy_p | OPEN | NOP | PRERDY |

If the state machine input command generated by the state machine controller 45 from the input command received thereby, is one of the shared state machine commands set forth in Table II, above, the state machine controller 45 generates the corresponding state machine output command and transmits the generated state machine output command to the output command decoder circuit 48. Conversely, if the state machine input command generated by the state machine controller 45 using the input command received from the input command decoder circuit 44 is one of the bank-specific state machine input commands set forth in Table III, above, the state machine controller 45 transmits both the input command received from the input command decoder circuit 44 and the state machine input command generated thereby to each state machine 46-1 through 46-8 of the state machine array 46.

In turn, each one of the state machines 46-1 through 46-8 examines the chip and bank address included in the input command generated by the input command decoder circuit 44 to determine if the state machine input command is intended for that particular state machine. If the chip and bank address included in the input command generated by the input command decoder circuit 44 identifies the memory bank corresponding to that state machine, the state machine will process the received state machine input command. Conversely, if the chip and bank address does not identify the memory bank corresponding to that state machine, the state machine will ignore the state machine input command. Thus, while all eight of the state machines 46-1 through 46-8 receive a particular state machine input command, only one of those state machines will undergo a state transition in accordance with the state diagram as described and illustrated below with respect to FIG. 3 and generate a state machine output command as set forth in Table I, above.

The state machine controller 45 regulates input command flow from the command FIFO 43 and state transitions, by the state machines 46-1 through 46-8, to-and-from bank-specific states. The state machine undergoing the state transition will return state information to the state machine controller 45. Using the state information received from the state machine undergoing the state transition, the state machine controller 45 generates the control signal which causes the input command decoder circuit 44 to fetch the contents issued to the input command decoder circuit 44 to initiate a fetch from the command FIFO 43. Of course, the state machine controller 45 would maintain the corresponding state information for the shared state transitions for which the state machine controller 45 generates state machine output commands on behalf of the state machines 46-1 through 46-8 and would generate the control signals based upon the state information maintained for these shared states. The state machine controller 45 will not, however, process a new burst request before the current burst is finished. The state machine controller 45 will also insert hidden precharges and activations during NOP cycles.

Whether received directly from the state machine controller 45 or from one of the state machines 46-1 through 46-8 of the state machine array, the output command decoder circuit 48 constructs the CKE, WE, CS, CAS and RAS commands which enable the memory controller 18 to access the specified location within one of the memory banks 20-1 through 20-8.

As previously set forth, the state machine array 46 is comprised of eight state machines 46-1 through 46-8, all of which share a common state diagram. In other words, in response to receipt of a command from the first decoder circuit 44 while in a first (or "current") state, each one of the state machines 46-1 through 46-8 will simultaneously transition to a second (or "next") state and simultaneously generate an output state machine command as detailed in Table I.

Figure 3:
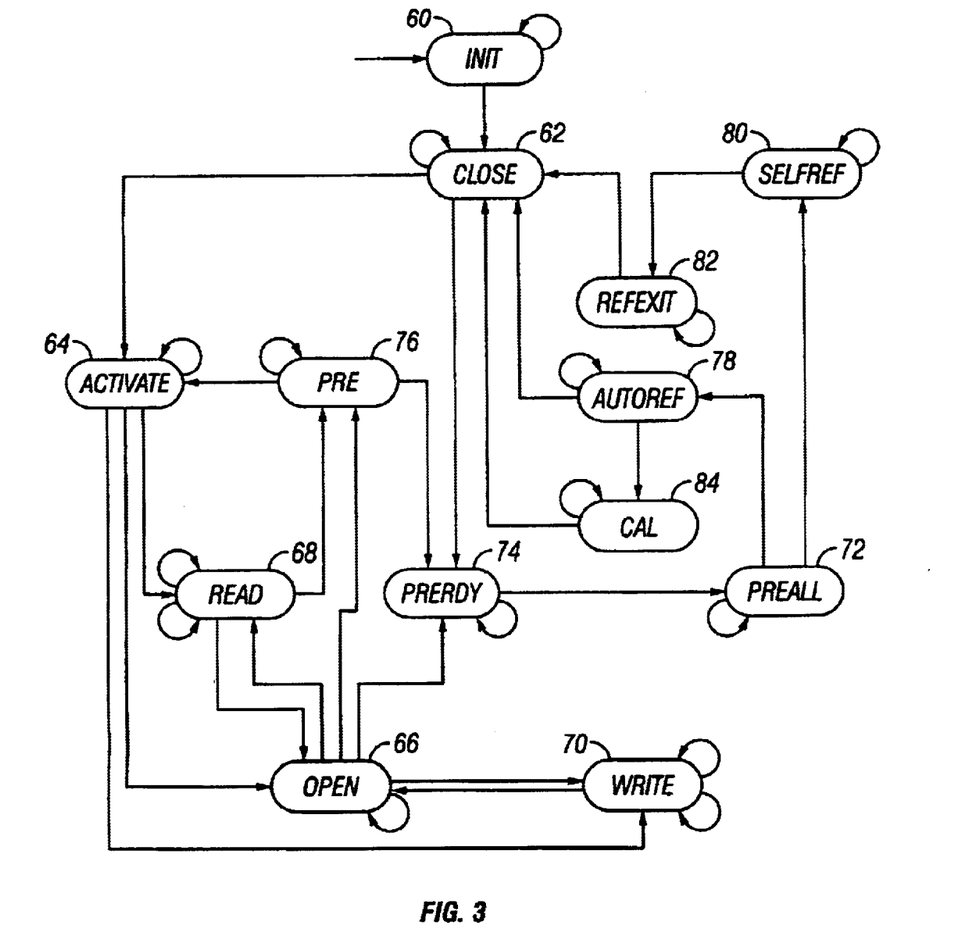
FIG. 3 is a state diagram for each state machine of a state machine array of the memory controller of FIG. 2.

Turning now to FIG. 3, the state diagram common to each of the state machines 46-1 through 46-8 will now be described in greater detail. As previously mentioned, the each state machine 46-1 through 46-8 has thirteen states—an INIT state 60 in which all of the memory banks 20-1 through 20-8 are in the process of initialization, a CLOSE state 62 in which the memory bank associated with the state machine is either closed or in the process of closing, an ACT state 64 in which the memory bank associated with the state machine is in the process of activation, an OPEN state 66 in which the memory bank associated with the state machine is either open or in the process of opening, a READ state 68 during which a read burst to the memory bank associated with the state machine is on-going, a WRITE state 70 during which a write burst to the memory bank associated with the state machine is on-going, a PREALL state 72 during which all of the memory banks are being precharged for auto refresh, a PRERDY state 74 in which the memory bank associated with the state machine is ready to be precharged for auto refresh, a PRE state 76 in which the memory bank associated with the state machine is ready to be precharged for either auto refresh or self refresh, an AUTOREF state 78 during which all of the memory banks are in the process of auto refresh, a SELFREF state 80 during which all of the memory banks are in the state of self refresh power down, a REFEXIT state 82 during which all of the memory banks are in the process of exiting self refresh power down, and a CAL state 84 during which all of the memory banks are in the process of calibrating.

Upon receipt of a md_q_reset_p command, a state machine, for example, the state machine 46-2, of the state machine array 46 will transition from any state into the INIT state 60. In this state, the state machine 46-2 will not output any commands while the memory controller 18 performs an initialization sequence defined by the JEDEC standard for DDR SDRAMs. Once initialized, the state machine 46-2 will either stay in the INIT state 60 if re-initialized by another md_q_reset_p command, stay in the INIT state without re-initialization if a md_nop_init_p command is received or transitioned to the CLOSE state 62 by a md_init_clos_p command. When transitioned to the CLOSE state, the state machine 46-2 outputs a no operation ("NOP") command. While the CLOSE state 62 is a stable state, as the memory bank is not ready for read or write bursts, the state machine 46-2 must be transitioned out of the CLOSE state 62 before a READ or WRITE to the memory bank 20-2 can be performed.

The state machine 46-2 may either be kept in the CLOSE state 62 using a md_nop_close_p command, transitioned to the PRERDY state 74 by a md_close_prerdy_p command, transitioned to the ACT state 64 by a md_close_activate_p command. When transitioned to the PRERDY state 74, the state machine 46-2 generates a NOP command. When transitioned to the ACT state 64, however, the state machine 46-2 generates an ACT command to activate the memory bank 20-2.

From the ACT state 64, the state machine 46-2 may either be kept in the ACT state 64 using a md_nop_activate_p command, transitioned to the READ state 68 using a md_activate_read_p command, transitioned to the OPEN state 66 using a md_activate_open_p, or transitioned to the WRITE state 70 using a md_activate_write_p command. If transitioned to the OPEN state 66, the state machine 46-2 generates a NOP command. If, however, the state machine 46-2 is transitioned to the READ state 68, the state machine 46-2 generates a READ command which, as previously set forth, initiates a read burst to the memory bank 20-2 and causes the state machine array controller 50 to generate a NOP command to the first decoder circuit 44. Finally, if transitioned to the WRITE state 70, the state machine 46-2 generates a WRITE command which, as previously set forth, initiates a write burst to the memory bank 20-2 and causes the state machine array controller 50 to generate a NOP command to the first decoder circuit 44.

The OPEN state 66 is a stable state from which read or write bursts can start immediately. Thus, from the OPEN state 66, the state machine 46-2 may either be kept in the OPEN state using a md_nop_open_p command, transitioned to the READ state 68 using a md_open_read_p command, transitioned to the WRITE state 70 using a md_open_write_p command, transitioned to the PRERDY state 74 using a md_open_prerdy_p command or transitioned to the PRE state 76 using a md_open_pre_p command. If kept in the OPEN state 66, the state machine 46-2 generates a NOP command If transitioned to the READ state 68, the state machine 46-2 generates a READ command which, as previously set forth, initiates a read burst to the memory bank 20-2 and causes the state machine array controller 50 to generate a NOP command to the first decoder circuit 44. If transitioned to the WRITE state 70, the state machine 46-2 generates a WRITE command which, as previously set forth, initiates a write burst to the memory bank 20-2 and causes the state machine array controller 50 to generate a NOP command to the first decoder circuit 44. If transitioned to the PRERDY state 74, the state machine 46-2 generates a NOP command. Finally, if transitioned to the PRE state 76, the state machine 46-2 generates a PRE command to precharge the memory bank 20-2 for a read or write burst.

From the READ state 68, the state machine 46-2 may either be kept in the READ state 68 using a md_nop_read_p command, kept in the READ state 68 using a md_read_read_p command, transitioned to the OPEN state 66 using a md_read_open_p command or transitioned to the PRE state 76 using a md_read_pre_p command. If kept in the READ state 68 using the md_nop_read_p command, the state machine 46-2 generates a NOP command. If, however, the state machine 46-2 is kept in the READ state 68 using the md_read_read_p command, the state machine 46-2 generates a READ command. If transitioned to the OPEN state 66, the state machine 46-2 generates a NOP command. Finally, if transitioned to the PRE state 76, the state machine 46-2 generates a PRE command to precharge the memory bank 20-2 for a read or write burst.

From the WRITE state 70, the state machine 46-2 may either be kept in the WRITE state 70 using a md_nop_write_p command, kept in the WRITE state 70 using a md_write_write_p, or transitioned to the OPEN state 66 using a md_write_open_p. If kept in the WRITE state 70 using the md_nop_write_p command, the state machine 46-2 generates a NOP command. If, however, the state machine 46-2 is kept in the WRITE state 70 using the md_write_write_p command, the state machine generates a WRITE command. Finally, if transitioned to the OPEN state 66, the state machine controller 46-2 generates a NOP command.

From the PRE state 76, the state machine 46-2 may either be kept in the PRE state 76 using a md_nop_pre_p command, transitioned to the ACT state 64 using a md_pre_activate_p command or transitioned to the PRERDY state 74 using a md_pre_prerdy_p command. If kept in the PRE state 76, the state machine 46-2 will generate a NOP command. If transitioned to the ACT state 64, however, the state machine 46-2 will generate an ACT command to activate the memory bank 20-2. Finally, if transitioned to the PRERDY state 74, the state machine 46-2 will generate a PRERDY command to precharge the memory bank 20-2 for either auto refresh or self refresh.

From the PRERDY state 74, the state machine 46-2 may either be kept in the PRERDY state 74 using a md_nop_prerdy_p command or transitioned to the PREALL state 74 using a md_prerdy_preall_p command. If kept in the PRRDY state 74, the state machine 46-2 generates a NOP command. If transitioned to the PREALL state 72, however, the state machine 46-2 will generate a PREALL command to precharge the memory bank 20-2 for an auto refresh. As the PREALL state 72 is a shared state, the state machine controller 45 will herd each of the other state machines 46-1 and 46-3 through 46-8 into the PREALL state 72 using additional md_prerdy_preall_p commands, thereby precharging the memory banks 20-1 and 20-3 through 20-8 for an auto refresh also.

From the PREALL state 72, the state machines 46-1 through 46-8 may either be kept together in the PREALL state 74 using respective md_nop_preall_p commands, transitioned together to the AUTOREF state 78 using respective md_preall_autoref_p commands, or transitioned together to the SELFREF state 80 using respective md_preall_selfref_p commands. If kept in the PREALL state 72, the state machines 46-1 through 46-8 will each generate a NOP command. If transitioned to the AUTOREF state 78, the state machines 46-1 through 46-8 will each generate a REFA command to auto refresh the memory banks 20-1 through 20-8. Finally, if transitioned to the SELFREF state 80, the state machines 46-1 through 46-8 will each generate a REFS command to initiate self refresh power down for the memory banks 20-1 through 20-8.

From the SELFREF state 80, the state machines 46-1 through 46-8 may either be kept together in the SELFREF state 80 using respective md_nop_selfref_p commands or transitioned together to the REFEXIT state 82 using respective md_selfref_refexit_p commands. If kept together in the SELFREF State 80, the state machines 46-1 through 46-8 will each generate a NOP command. If transitioned together to the REFEXIT state 82, however, the state machines 46-1 through 46-8 will each generate a SREX command to cause all of the memory banks 20-1 through 20-8 to exit self refresh power down.

From the AUTOREF state 78, the state machine 46-2 may either be kept together in the AUTOREF state 78 using respective md_nop_autoref_p commands, transitioned together to the CLOSE state 62 using respective md_autoref_close_p commands, or transitioned together to the CAL state 84 using respective md_autoref_cal_p commands. Whether kept in the AUTOREF state 78, transitioned to the CLOSE state 62 or transitioned to the CAL state 84, the state machines 46-1 through 46-8 will each issue a NOP command.

From the REFEXIT state 82, the state machines 46-1 through 46-8 may either be kept together in the REFEXIT state 82 using respective md_nop_refexit_p commands or transitioned together to the CLOSE state 62 using respective md_refexit_close_p commands. Whether kept in the REFEXIT state 82 or transitioned to the CLOSE state 62, the state machines 46-1 through 46-8 will each issue a NOP command.

From the CAL state 84, the state machines 46-1 through 46-8 may either be kept together in the CAL state 84 using respective md_nop_cal_p commands or transitioned together to the CLOSE state 62 using respective md_cal_close_p commands. Whether kept together in the CAL state 84 or transitioned together to the CLOSE state 62, the state machines 46-1 through 46-8 will each issue a NOP command Each state machine 46-1 through 46-8 is constructed using conventional combinational logic circuitry uniquely configured to embody the state diagram illustrated in FIG. 3. Thus, as each state machine 46-1 through 46-8 share a common state diagram, each would further share the same configuration of logical circuitry. As previously noted, a number of the states are shared. In other words, all of the state machines 46-1 through 46-8 would be in the same state at the same time. To reduce the number of logic circuits needed to construct each state machine, those logic circuits corresponding to the shared states have been incorporated in the state machine controller 45. By doing so, there is no need to include the logic circuits corresponding to the shared states in each one of the state machines 46-1 through 46-8 of the state machine array 46. It should be readily appreciated, however, that the invention may be configured without placing a portion of logical circuitry for each state machine 46-1 through 46-8 of the state machine array 46 in the state machine controller 45. However, because it would consume more logical circuitry, such an alternate embodiment is considered somewhat disadvantageous to the one disclosed and illustrated herein. The state machines would be further complicated in that the chip and bank addresses could not be used by themselves to determine if a state machine must undergo a state transition and generate a state machine output command in response to receipt of a state machine input command thereby. Rather, the state machines would also have to be able to distinguish between those state machine input commands (specifically, the bank-specific state machine input commands) for which the chip and bank addresses must be examined to determine if that state machine should respond thereto and for those state machine input commands (specifically, the shared-state machine input commands) for which the chip and bank addresses need not be examined to determine if the state machine should respond thereto.

Figure 2B:
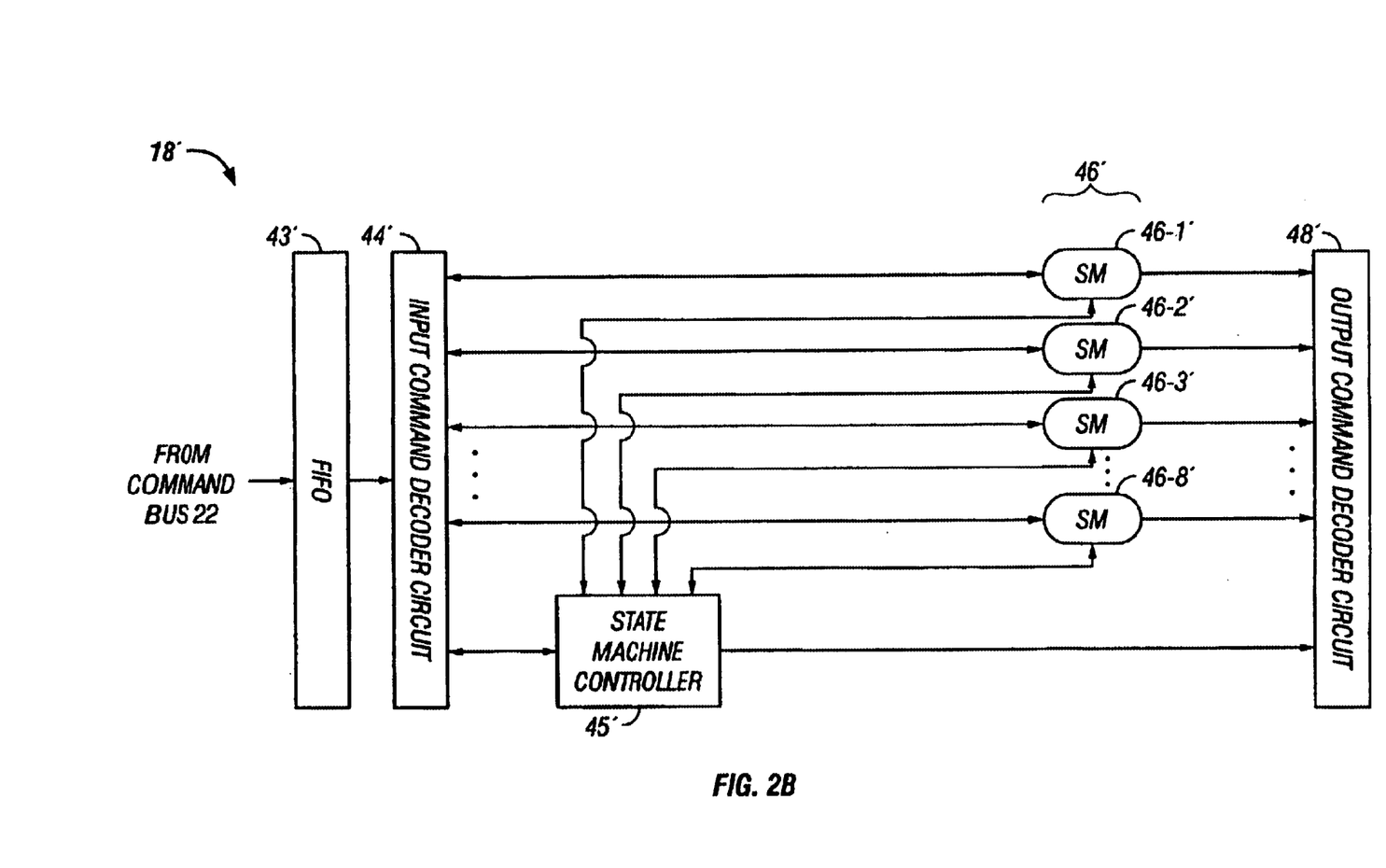
FIG. 2B is an expanded block diagram illustrating an alternate configuration of the memory controller of FIG. 2A.

Referring next to FIG. 2B, an alternate configuration of the memory controller 18, hereafter referenced as memory controller 18', will now be described in greater detail. As before, only a first, or output command generation, portion of the memory controller 18', specifically, that portion of the memory controller 18' that uses raw read/write commands received over the command bus 22 to generate output commands to be used in connection with data reads and/or data writes to/from the main memory 20 and issues the generated output commands to the main memory 20, is described and illustrated herein while the remaining portions of the memory controller 18', specifically, those portions of the memory controller 18' dedicated to transmitting write data to the main memory 20 and receiving read data from the main memory 20, have been omitted from FIG. 2B for ease of description.

The output command generation portion of the memory controller 18' is comprised of a command first-in-first-out (FIFO) register 43' an input command decoder circuit 44', a state machine array controller 45', a state machine array 46' comprised of eight state machines 46-1' through 46-8', and an output command decoder circuit 48'. Similar to the configuration of the memory controller 18 illustrated in FIG. 2A, here, the state machine controller 45' is coupled to the input command decoder circuit 44' and the output command decoder circuit 48' is coupled to the state machine controller 45'. Unlike the prior configuration of the memory controller 18, however, in addition to being coupled to the state machine controller 45' and the output command decoder circuit 48', each state machine 46-1' through 46-8' is also coupled to the input command decoder circuit 44'. While the memory controller 18' includes a number of additional connections, specifically, the additional connections between the input command decoder circuit 44' and the state machines 46-1' through 46-8', the state machine controller 45' no longer needs to both pass the input commands generated by the input command decoder circuit 44' to each of the state machines 46-1' through 46-8' and also process the received input commands to generate state machine input commands.

The operation of the memory controller 18' differs slightly from that of the memory controller 18. As before, when the state machine array 46' is ready for a new state machine input command, the state machine controller 45' issues a control signal to the input command decoder circuit 44' which causes the input command decoder circuit 44' to fetch the contents of a first entry in the command FIFO 43'. Within the input command decoder circuit 44', raw commands fetched from the first entry of the command FIFO 43' are converted into input commands which include, among other components, a chip and bank address for the data transfer request. The commands generated by the input command decoder 44' are transmitted to each state machine 46-1' through 46-8' of the state machine array 46' as well as to the state machine controller 45'. The state machine controller 45' further decodes the received input command by determining a state machine input command corresponding to the received input command.

If the state machine input command generated by the state machine controller 45' from the input command received thereby, is one of the shared state machine commands set forth in Table II, above, the state machine controller 45' generates the corresponding state machine output command and transmits the generated state machine output command to the output command decoder circuit 48'. Conversely, if the state machine input command generated by the state machine controller 45' using the input command received from the input command decoder circuit 44' is one of the bank-specific state machine input commands set forth in Table III, above, the state machine controller 45' transmits the state machine input command generated thereby to each state machine 46-1' through 46-8' of the state machine array 46'. In turn, each one of the state machines 46-1' through 46-8' examines the chip and bank address included in the input command received from the input command decoder circuit 44' to determine if the state machine input command received from the state machine controller 45' is intended for that particular state machine. If the chip and bank address included in the input command received from the input command decoder circuit 44' identifies the memory bank corresponding to that state machine, the state machine will process the state machine input command received from the state machine controller 45'. Conversely, if the chip and bank address does not identify the memory bank corresponding to that state machine, the state machine will ignore the state machine input command.

Thus, as before, while all eight of the state machines 46-1' through 46-8' receive the state machine input commands generated by the state machine controller 45', only one of those state machines will undergo a state transition in accordance with the state diagram as described and illustrated below with respect to FIG. 3 and generate a state machine output command as set forth in Table I, above. In addition the state machine undergoing the state transition will return state information to the state machine controller 45'. Using the state information received from the state machine undergoing the state transition, the state machine controller 45' generates the control signals to be issued to the input command decoder circuit 44'. Of course, the state machine controller 45' would maintain the corresponding state information for the shared state transitions for which the state machine controller 45' generates state machine output commands on behalf of the state machines 46-1' through 46-8' and would generate the control signals based upon the state information maintained for these shared states.

Whether received directly from the state machine controller 45' or from one of the state machines 46-1' through 46-8' of the state machine array, the output command decoder circuit 48' constructs the CKE, WE, CS, CAS and RAS commands which enable the memory controller 18' to access the specified location within one of the memory banks 20-1 through 20-8.

Those skilled in the art will appreciate that the present invention may be accomplished with circuits other than those particularly depicted and described in connection with the drawings and it should be clearly understood that the drawings represent just one of many possible implementations of the present invention. It should be further appreciated that, although specific embodiments of the invention have been described herein, various modifications may be made without deviating from the spirit and scope of the invention. Those skilled in the art should also appreciate that various terms used herein are sometimes used with somewhat different meanings. For example, the term "bank" may refer solely to a memory bank or may refer to both the memory bank and its associated access circuitry. A "command" may refer solely to a command type (e.g., read or write), or may refer also to the associated address to which the command is directed. The term "couple" or "coupled" may refer solely to a direct connection between two elements, may refer solely to an indirect connection between two elements, or may refer to both. Therefore, terms used in the claims which follow shall be construed to include any of the various meanings know to those skilled in the art. Accordingly, the scope of the invention should not be limited by the above disclosure. Rather, the scope of the invention should be defined by the appended claims.

What is claimed is:

1. A computer system, comprising:

a processor;

a memory having a plurality of memory banks; and a memory controller coupling said processor with said memory, said memory controller including a state machine controller, a plurality of state machines, each coupled to said state machine controller, and an output command decoder coupled to said state machine controller and to each one of said plurality of state machines, each one of said plurality of state machines having an input side coupled to said processor through said state machine controller and an output side coupled to a corresponding one of said plurality of memory banks through said output command decoder circuit;

said state machine controller generating a state machine input command from an input command received thereby;

each one of said plurality of state machines configured to commonly receive a state machine instruction and a memory address from said state machine controller if said state machine input command is a bank specific state machine input command;

wherein a first one of said plurality of state machines executes said state machine instruction if said memory address corresponds to an address for said corresponding one of said plurality of memory banks; and wherein said output command decoder is configured to receive a state machine output command from said state machine controller if said state machine input command is a shared state machine input command and to receive a state machine outpit command from said first one of said plurality of state machines if said state machine input command is a bank specific state machine input command.

2. The a computer system of claim 1, wherein said plurality of state machines are coupled parallel to one another between said state machine controller and said output command decoder circuit.

3. A computer system, comprising:

a processor;

a memory having a plurality of memory banks; and a memory controller coupling said processor with said memory, said memory controller comprising:

an input command decoder circuit coupled to receive a raw command originating at said processor, said input command decoder circuit decoding said raw command to produce an input command;

a state machine controller coupled to receive said input command from said input command decoder circuit, said state machine controller generating a state machine input instruction from said input command;

a state machine array comprised of a plurality of state machines, each one of said plurality of state machines corresponding to one of said plurality of memory banks and coupled for receiving input commands and state machine input instructions from said state machine controller;

an output command decoder circuit for receiving a state machine output command and generating an output command therefrom for transmission to said memory;

wherein a first one of said plurality of state machines generates a first state machine output command, to be received by said output command decoder circuit, from a state machine input instruction transmitted, by said state machine controller, to each one of said plurality of state machines if an input command, transmitted by said state machine controller to each one of said plurality of state machines contains an address, within said memory, located within a corresponding one of said plurality of memory banks; and wherein said state machine controller generates a second state machine output command, to be received by said output command decoder circuit, if a state machine input instruction, generated by said state machine controller, is a shared state machine input instruction.

4. The computer system of claim 3, wherein each one of said plurality of state machines is configured in accordance with a common state diagram.

5. The computer system of claim 4, wherein said common state diagram is comprised of first and second portions, said first portion of said common state diagram containing bank-specific states thereof and said second portion of said common state diagram containing shared states thereof.

6. The computer system of claim 3, wherein said state machine controller generates said state machine input instruction and said input command, received by each one of said plurality of state machines, if said state machine input instruction, generated by said state machine controller, is a bank-specific state machine input instruction.

7. The computer system of claim 6, wherein each one of said plurality of state machines is configured in accordance with a common state diagram.

8. The computer system of claim 7 wherein said common state diagram is comprised of first and second portions, said first portion of said common state diagram containing bank-specific states thereof and said second portion of said common state diagram containing shared states thereof.

9. A computer system, comprising:

a processor;

a memory having a plurality of memory banks; and a memory controller coupling said processor with said memory, said memory controller comprising:

an input command decoder circuit coupled to receive a raw command originating at said processor, said input command decoder circuit decoding said raw command to produce an input command;

a state machine controller coupled to receive said input command from said input command decoder circuit, said state machine controller generating a state machine input instruction from said input command;

a state machine array comprised of a plurality of state machines, each one of said plurality of state machines corresponding to one of said plurality of memory banks, coupled for receiving input commands and state machine input instructions from said state machine controller and configured in accordance with a common state diagram comprised of first and second portions, said first portion of said common state diagram containing bank-specific states and said second portion of said common state diagram containing shared states thereof; and an output command decoder circuit for receiving a state machine output command and generating an output command therefrom for transmission to said memory;

wherein a first one of said plurality of state machines generates a first state machine output command from a state machine input command transmitted, by said state machine controller, to each one of said plurality of state machines if an input command, transmitted by said state machine controller to each one of said plurality of state machines contains an address, within said memory, located within a corresponding one of said plurality of memory banks; and wherein said state machine controller generates said state machine output command for transmission to said output command decoder circuit if said state machine input command would cause a state machine configured in accordance with said common state diagram to enter or exit one of said shared states.

10. The computer system of claim 9, wherein said first one of said plurality of state machines generate said state machine output command for transmission to said output command decoder circuit if said state machine input command would cause a state machine configured in accordance with said common state diagram to transition between first and second ones of said bank-specific states.

11. A computer system, comprising:

a processor;

a memory having a plurality of memory banks; and a memory controller coupling said processor with said memory, said memory controller comprising:

an input command decoder circuit coupled to receive a raw command originating at said processor, said input command decoder circuit decoding said raw command to produce an input command;

a state machine controller coupled to receive said input command from said input command decoder circuit, said state machine controller generating a state machine input instruction from said input command;

a state machine array comprised of a plurality of state machines, each one of said plurality of state machines corresponding to one of said plurality of memory banks, coupled for receiving input commands and state machine input instructions from said state machine controller and configured in accordance with a common state diagram comprised of first and second portions, said first portion of said common state diagram containing bank-specific states and said second portion of said common state diagram containing shared states thereof; and an output command decoder circuit for receiving a state machine output command and generating an output command therefrom for transmission to said memory;

wherein a first one of said plurality of state machines generates a first state machine output command from a state machine input command transmitted, by said state machine controller, to each one of said plurality of state machines if an input command, transmitted by said state machine controller to each one of said plurality of state machines contains an address, within said memory, located within a corresponding one of said plurality of memory banks; and wherein said first one of said plurality of state machines generates said state machine output command for transmission to said output command decoder circuit if said state machine input command would cause a state machine configured in accordance with said common state diagram to transition between first and second ones of said bank-specific states.

12. A computer system, comprising:

a processor;

a memory having a plurality of memory banks; and a memory controller coupling said processor with said memory, said memory controller comprising:

an input command decoder circuit coupled to receive a raw command originating at said processor, said input command decoder circuit decoding said raw command to produce an input command;

a state machine controller coupled to receive said input command from said input command decoder circuit, said state machine controller generating a state machine input instruction from said input command;

a state machine array comprised of a plurality of state machines, each one of said plurality of state machines corresponding to one of said plurality of memory banks and coupled to receive said input command from said input command decoder circuit and state machine input instructions from said state machine controller;

an output command decoder circuit for receiving a state machine output command and generating an output command therefrom for transmission to said memory;

wherein a first one of said plurality of state machines generates a first state machine output command, to be received by said output command decoder circuit, from a state machine input instruction received from said state machine controller if said received input command contains an address, within said memory, located within a corresponding one of said plurality of memory banks; and wherein said state machine controller generates a second state machine output command, to be received by said output command decoder circuit, if a state machine input instruction, generated by said state machine controller, is a shared state machine input instruction.

13. The computer system of claim 12, wherein each one of said plurality of state machines is configured in accordance with a common state diagram.

14. The computer system of claim 13, wherein said common state diagram is comprised of first and second portions, said first portion of said common state diagram containing bank-specific states thereof and said second portion of said common state diagram containing shared states thereof.

15. The computer system of claim 12, wherein said state machine controller and said input command decoder circuit respectively generate said state machine input instruction and said input command, received by each one of said plurality of state machines, if said state machine input instruction, generated by said state machine controller, is a bank-specific state machine input instruction.

16. The computer system of claim 15, wherein each one of said plurality of state machines is configured in accordance with a common state diagram.

17. The computer system of claim 16 wherein said common state diagram is comprised of first and second portions, said first portion of said common state diagram containing bank-specific states thereof and said second portion of said common state diagram containing shared states thereof.

18. A computer system, comprising:

a processor;

a memory having a plurality of memory banks; and a memory controller coupling said processor with said memory, said memory controller comprising:

an input command decoder circuit coupled to receive a raw command originating at said processor, said input command decoder circuit decoding said raw command to produce an input command;

a state machine controller coupled to receive said input command from said input command decoder circuit, said state machine controller generating a state machine input instruction from said input command;

a state machine array comprised of a plurality of state machines, each one of said plurality of state machines corresponding to one of said plurality of memory banks, coupled to receive said input command from said input command decoder circuit and state machine input instructions from said state machine controller and configured in accordance with a common state diagram comprised of first and second portions, said first portion of said common state diagram containing bank-specific states and said second portion of said common state diagram containing shared states thereof;

an output command decoder circuit for receiving a state machine output command and generating an output command therefrom for transmission to said memory;

wherein a first one of said plurality of state machines generates a first state machine output command from a state machine input command received from said state machine controller if said received input command contains an address, within said memory, located within a corresponding one of said plurality of memory banks; and wherein said state machine controller generates said state machine output command for transmission to said output command decoder circuit if said state machine input command would cause a state machine configured in accordance with said common state diagram to enter or exit one of said shared states.

19. The computer system of claim 18, wherein said first one of said plurality of state machines generates said state machine output command for transmission to said output command decoder circuit if said state machine input command would cause a state machine configured in accordance with said common state diagram to transition between first and second ones of said bank-specific states.

20. A computer system, comprising:

a processor;

a memory having a plurality of memory banks; and a memory controller coupling said processor with said memory, said memory controller comprising:

an input command decoder circuit coupled to receive a raw command originating at said processor, said input command decoder circuit decoding said raw command to produce an input command;

a state machine controller coupled to receive said input command from said input command decoder circuit, said state machine controller generating a state machine input instruction from said input command;

a state machine array comprised of a plurality of state machines, each one of said plurality of state machines corresponding to one of said plurality of memory banks coupled to receive said input command from said input command decoder circuit and state machine input instructions from said state machine controller and configured in accordance with a common state diagram comprised of first and second portions, said first portion of said common state diagram containing bank-specific states and said second portion of said common state diagram containing shared states thereof;

an output command decoder circuit for receiving a state machine output command and generating an output command therefrom for transmission to said memory;

wherein a first one of said plurality of state machines generates a first state machine output command from a state machine input command received from said state machine controller if said received input command contains an address, within said memory, located within a corresponding one of said plurality of memory banks; and wherein said first one of said plurality of state machines generates said state machine output command for transmission to said output command decoder circuit if said state machine input command would cause a state machine configured in accordance with said common state diagram to transition between first and second ones of said bank-specific states.

21. A multi-bank memory device, comprising:

a plurality of memory banks;

a state machine controller coupled to said plurality of memory banks via first and second paths, said state machine controller controlling the state of said plurality of memory banks via said first path when each of said plurality of memory banks are in a common state; and a state machine array coupled to said second path between said state machine controller and said plurality of memory banks, said state machine array comprised of a plurality of state machines, each controlling the state of a corresponding one of the plurality of memory banks when said corresponding one of said plurality of memory banks is in a bank-specific state;

wherein said multi-bank memory device has a memory bank-to-state machine ratio of 1:1.

22. The multi-bank memoy device of claim 21 wherein said multi-bank memory device is a SDRAM device.

23. The multi-bank memory device of claim 21 wherein said multi-bank memory device is a DDR SDRAM device.

24. The apparatus multi-bank memory device of claim 21, wherein said state machine controller is coupled to an input side of said state machine array, said state machine controller generating a state machine instruction from an input command received thereby and selectively transmitting said generated state machine instruction to each one of said plurality of state machines of said state machine array via said first path.

25. The multi-bank memory device of claim 24, wherein said state machine controller transmits both said input command and said state machine instruction to each one of said plurality of state machines of said state machine array and wherein a first one of said plurality of state machines executes said state machine instruction if a memory address contained in said input command corresponds to an address for said corresponding one of said plurality of memory banks.

26. The multi-bank memory device of claim 25, wherein each one of said plurality of state machines are configured in accordance with a common state diagram.

27. The multi-bank memory device of claim 26, wherein said common state diagram is comprised of first and second portions, said first portion of said common state diagram containing bank-specific states thereof and said second portion of said common state diagram containing shared states thereof.

28. The multi-bank memory device of claim 21, wherein;

said state machine controller is coupled to an input side of said state machine array;

each one of said state machines of said state machine array and said state machine controller commonly receiving an input command;

said state machine controller generating a state machine instruction from said input command received thereby and selectively transmitting said generated state machine instruction to each one of said plurality of state machines of said state machine array.

29. The multi-bank memory device of claim 28, wherein said state machine controller generates said state machine instruction to each one of said plurality of state machines of said state machine array and wherein a first one of said plurality of state machines executes said state machine instruction if a memory address contained in said input command corresponds to an address for said corresponding one of said plurality of memory banks.

30. The multi-bank memory device of claim 29, wherein each one of said plurality of state machines are configured in accordance with a common state diagram.

31. The multi-bank memory device of claim 30, wherein said common state diagram is comprised of first and second portions, said first portion of said common state diagram containing bank-specific states thereof and said second portion of said common state diagram containing shared states thereof.

32. A multi-bank memory device, comprising:

a plurality of memory banks;

a state machine array coupled to said plurality of memory banks, said state machine array comprised of a plurality of state machines, each controlling the state of a corresponding one of the plurality of memory banks;

a state machine controller coupled to an input side of said state machine array, said state machine controller generating a state machine instruction from an input command received thereby and selectively transmitting said generated state machine instruction to each one of said plurality of state machines of said state machine array;

said state machine controller transmits both said input command and said state machine instruction to each one of said plurality of state machines of said state machine array and wherein a first one of said plurality of state machines executes said state machine instruction if a memory address contained in said input command corresponds to an address for said corresponding one of said plurality of memory banks;

each one of said plurality of state machines are configured in accordance with a common state diagram having first and second portions, said first portion of said common state diagram containing bank-specific states thereof and said second portion of said common state diagram containing shared states thereof;

said first one of said plurality of state machines or said state machine controller generating a state machine output command in response to receiving said state machine input command;

said first one of said plurality of state machines generating said state machine output command if said state machine input command would cause a state machine configured in accordance with said common state diagram to transition between first and second ones of said bank-specific states; and said state machine controller generating said state machine output command if said state machine input command would cause a state machine configured in accordance with said common state diagram to enter or exit one of said shared states.

33. A multi-bank memory device, comprising:

a plurality of memory banks;

a state machine array coupled to said plurality of memory banks, said state machine array comprised of a plurality of state machines, each controlling the state of a corresponding one of the plurality of memory banks;

a state machine controller coupled to an input side of said state machine array, each one of said state machines of said state machine array and said state machine controller commonly receiving an input command, each one of said plurality of state machines configured in accordance with a common state diagram having first and second portions, said first portion of said common state diagram containing bank-specific states thereof and said second portion of said common state diagam containing shared states thereof;

said state machine controller generating a state machine instruction from said input command received thereby and selectively transmitting said generated state machine instruction to each one of said plurality of state machines of said state machine array, a first one of said plurality of state machines executes said state machine instruction if a memory address contained in said input command corresponds to an address for said corresponding one of said plurality of memory banks;

said first one of said plurality of state machines or said state machine controller generating a state machine output command in response to receiving said state machine input command;

said first one of said plurality of state machines generating said state machine output command if said state machine input command would cause a state machine configured in accordance with said common state diagram to transition between first and second ones of said bank-specific states; and said state machine controller generating said state machine output command if said state machine input command would cause a state machine configured in accordance with said common state diagram to enter or exit one of said shared states; and wherein said multi-bank memory device has a memory bank-to-state machine ratio of 1:1.

34. A method for constructing a memory device, comprising:

providing a state machine controller, a first plurality of state machines and a second plurality of memory banks; and coupling said state machine controller, said first plurality of state machines and said second plurality of memory banks such that: (1) each one of said first plurality of state machines control the state of a corresponding one of said second plurality of memory banks if said state machine controller indicates that a selected one of said second plurality of memory banks is to enter a bank-specific state and (2) said state machine controller controls the state of each one of said second plurality of memory banks if said state machine controller indicates that all of said second plurality of state machines are to enter a common state;

wherein said first plurality of state machines and said second plurality of memory banks are interconnected in a state machine-to-memory bank ratio of 1:1.

* * * * *